US012709572B2

(12) United States Patent
Soon-Shiong

(10) Patent No.: US 12,709,572 B2
(45) Date of Patent: Aug. 18, 2026

(54) HYDROPHOBIC CONCRETE AND ASPHALT

(71) Applicant: Nant Holdings IP, LLC, Culver City, CA (US)

(72) Inventor: Patrick Soon-Shiong, Culver City, CA (US)

(73) Assignee: Nant Holdings IP, LLC, Culver City, CA (US)

( * ) Notice: Subject to any disclaimer, the term of this patent is extended or adjusted under 35 U.S.C. 154(b) by 0 days.

(21) Appl. No.: 19/411,572

(22) Filed: Dec. 8, 2025

(65) Prior Publication Data

US 2026/0132078 A1 May 14, 2026

Related U.S. Application Data

(62) Division of application No. 19/289,934, filed on Aug. 4, 2025, which is a division of application No. 18/948,108, filed on Nov. 14, 2024, now Pat. No. 12,410,096.

(51) Int. Cl.

*C04B 14/28* (2006.01)
*C04B 14/02* (2006.01)
*C04B 40/00* (2006.01)
*C23F 11/18* (2006.01)
*C04B 103/61* (2006.01)

(52) U.S. Cl.

CPC ............ *C04B 14/022* (2013.01); *C04B 14/28* (2013.01); *C04B 40/0028* (2013.01); *C23F 11/187* (2013.01); *C04B 2103/61* (2013.01)

(58) Field of Classification Search

CPC ... C04B 14/022; C04B 14/28; C04B 40/0028; C04B 2103/61; C04B 14/26; C04B 14/02; C04B 2103/60; C04B 2103/00; C04B 2111/00034; C23F 11/187; C23F 11/00; C23F 11/18

See application file for complete search history.

(56) References Cited

U.S. PATENT DOCUMENTS

| | | | | |
|---|---|---|---|---|
| 11,136,243 | B1 * | 10/2021 | Soon-Shiong | C25B 11/075 |
| 11,649,550 | B1 | 5/2023 | Soon-Shiong et al. | |
| 2022/0047474 | A1 * | 2/2022 | Soon-Shiong | A61K 8/21 |

FOREIGN PATENT DOCUMENTS

| | | | | |
|---|---|---|---|---|
| CN | 112851237 A | | 5/2021 | |
| CN | 118184267 A | * | 6/2024 | C04B 28/04 |
| EP | 4242182 A | | 9/2023 | |
| WO | 2020150274 A1 | | 7/2020 | |

OTHER PUBLICATIONS

CN-118184267-A, machine translation (Year: 2024).*

Shaoyong et al. Reinforcement effects on the tensile properties of seawater sea-sand engineered cementitious composites reinforced with multi-scale hybrid fibers, Structures, V 64, 2024,106579. DOI:10.1016/j.istruc.2024.106579. (Year: 2024).*

Jiříčková A, Jankovský O, Sofer Z, Sedmidubský D. Synthesis and Applications of Graphene Oxide. Materials (Basel). Jan. 25, 2022; 15(3):920. doi: 10.3390/ma15030920. (Year: 2022).*

Dong, et al., "Control of Superhydrophilic and Superhydrophobic Graphene Interface", Scientific Reports, vol. 3, No. 1733, Apr. 25, 2013.

Kim, et al.,"Functionalization of Carbon Nanotube Surface via UV/O3 Treatment", Solid State Phenomena vols. 121-123 (2007) pp. 1407-1410.

Kong, et al., "Constitutive rheological control to develop a self-consolidating engineered cementitious composite reinforced with hydrophilic poly(vinyl alcohol) fibers" Cement & Concrete Composites 25 (2003) 333-341.

Li, et al., "Flexural Behaviors of glass fiber-reinforced polymer (GFRP) reinforced engineered cementitious composite beams", ACI Materials Journal ■ Jan.-Feb. 2002, pp. 11-21.

Rafiee, et al., "Superhydrophobic to Superhydrophilic Wetting Control in Graphene Films", Advanced Materials, vol. 22, No. 9, pp. 2151-2154, May 18, 2010.

Ranade, et al., "Composite Properties of High-Strength, High-Ductility Concrete", ACI Materials Journal, V. 110, No. 4, Jul.-Aug. 2013, 11 pages.

Ranade, et al., "Influence of micro-cracking on the composite resistivity of Engineered Cementitious Composites", Cement and Concrete Research, vol. 58 , pp. 1-12, 2014.

Sakulich, et al., "Nanoscale characterization of engineered cementitious composites (ECC)" Cem. Concr. Res.,7 pages, 2010.

Seymour, et al., "Hot mixing: Mechanistic insights into the durability of ancient Roman concrete.", Science Advances, vol. 9, No. 1, Jan. 26, 2023.

Sham, et al., "Surface functionalities of multi-wall carbon nanotubes after UV/Ozone and TETA treatments", Carbon 2006, 1 page.

Siddiqui, et al., "Carbon Nanotubes with Dual Wall Structure; Properties and Fracture Behavior of Epoxy Nanocomposites", Department of Mechanical Engineering, Hong Kong University of Science and Technology, Clear Water Bay, Hong Kong, 2009, 12 pages.

Soon-Shiong, P., "Aragonite Compositions, Methods, & Uses Thereof", U.S. Appl. No. 63/233,660, filed Aug. 16, 2021, 38 pages.

Soon-Shiong, P., "Aragonite Uses for Making Paving Compositions", U.S. Appl. No. 62/874,253, filed Jul. 15, 2019, 31 pages.

Soon-Shiong, P., "Aragonite Uses", U.S. Appl. No. 62/792,735, filed Jan. 15, 2019, 28 pages.

Soon-Shiong, P., "Aragonite Uses", U.S. Appl. No. 62/867,489, filed Jun. 27, 2019, 27 pages.

(Continued)

*Primary Examiner* — Marites A Guino-O Uzzle
(74) *Attorney, Agent, or Firm* — Umberg Zipser LLP; Martin Fessenmaier; Priti Phukan

(57) ABSTRACT

A method of making superhydrophobic concrete includes creating a mixture, wherein the mixture comprises aragonite and/or graphene, and heating the mixture to a temperature between 500° C. and 2,500° C., then drying the mixture, and, optionally, adding the mixture to concrete.

13 Claims, No Drawings

(56) References Cited

OTHER PUBLICATIONS

Wang, et al., "Role of surfactant molecular weight on morphology and properties of functionalized graphite oxide filled polypropylene nanocomposites", Langmuir, vol. 26, pp. 16110-16114, 2010.

Wu, et al., "Graphene tailored by Fe3O4 nanoparticles: low-adhesive and durable superhydrophobic coatings", RSC Advances, iss. 28, No. 9, p. 16235, 2019.

Zhang, et al., "Formation of Superhydrophobic Microspheres of Poly(vinylidene fluoride-hexafluoropropylene)/Graphene Composite via Gelation", Langmuir, vol. 27, No. 14, pp. 8943-8949, Jun. 9, 2011.

* cited by examiner

HYDROPHOBIC CONCRETE AND ASPHALT

This application is a divisional application of allowed U.S. application with the Ser. No. 19/289,934, which was filed Aug. 4, 2025, which is a divisional application of U.S. Pat. No. 12,410,096, Ser. No. 18/948,108, filed on Nov. 14, 2024, all of which are incorporated by reference herein.

FIELD OF THE INVENTION

The field of the invention is methods and compositions for superhydrophobic concrete and asphalt, especially as it relates to reducing water penetration into concrete and asphalt and reducing overall carbon dioxide emission caused by producing concrete and asphalt.

BACKGROUND OF THE INVENTION

The background description includes information that may be useful in understanding the present invention. It is not an admission that any of the information provided herein is prior art or relevant to the presently claimed invention, or that any publication specifically or implicitly referenced is prior art.

All publications and patent applications herein are incorporated by reference to the same extent as if each individual publication or patent application were specifically and individually indicated to be incorporated by reference. Where a definition or use of a term in an incorporated reference is inconsistent or contrary to the definition of that term provided herein, the definition of that term provided herein applies and the definition of that term in the reference does not apply.

Globally, concrete is the most widely used building material and accounts for around 8-10% of global $CO_2$ emissions. If the industry were a country, it would be the third-largest $CO_2$ polluter in the world, behind only the USA and China. "According to the National Ready Mixed Concrete Association, each pound of concrete releases 0.93 pounds of carbon dioxide. Since concrete is such a widespread item, the amount of CO2 released in the industry continues to grow." (Ramsden, K. (2020, November 3). Cement and concrete: The environmental impact—PSCI. Princeton University).

In addition to the challenge of minimizing pollution in the concrete production industry, another issue arises due to the porous nature of concrete. "Because concrete is a type of porous material, water or air can permeate freely into the concrete and that decreases the durability of concrete," presenting yet another challenge in this industry. (Yoo, J.-H., Lee, H.-S., & Ismail, M. (2011). An analytical study on the water penetration and diffusion into concrete under water pressure. Construction and Building Materials, 25(1), 99-108). Water and air penetration into concrete also presents the risk of rusting.

Regarding traditional concrete production, the final properties of concrete are determined by the hydration process and microstructural development. These are determined by water content, curing conditions, heat of hydration, admixtures, chemical composition and physical properties of raw materials. During the curing of traditional, normal concrete, tensile shear capacity and coefficient of thermal expansion are low, hydration of cement constituents continues filling up most of the water-filled pore space with hydrated products and connecting the solid phases of the cement matrix, and reinforcing agents are commonly added to avoid shrinkage and increase tensile capacity. As a result, traditional concrete relies on steel reinforcement, added cement, and a combination of plasticizers, fiber reinforcement, and other additives to counter these issues, all of which increase the CO2 output of concrete.

Thus, there is a need in the art for concrete which causes less pollution, and concrete that is more resistant to water and air penetration.

SUMMARY OF THE INVENTION

The inventive subject matter is directed to various methods and compositions for hydrophobic or superhydrophobic concrete and asphalt. Particularly, the inventor contemplates a method of making superhydrophobic concrete, preferably by creating a mixture, wherein the mixture comprises aragonite and/or graphene, and heating the mixture to a temperature between 500° C. and 2,500° C., then drying the mixture, and, optionally, adding the mixture to concrete. In some contemplated aspects, the inventors contemplate further that oxygen may be removed from the mixture before the mixture is added to concrete. In other aspects, the mixture may be made into a paint, a resin, or a filler before being added to concrete.

In preferred aspects, the mixture may comprise less than 1 kg, less than 2 kg, less than 5 kg, less than 10 kg, less than 20 kg, less than 50 kg, less than 75 kg, or less than 100 kg of graphene for every 10,000 kilograms of concrete. In other preferred aspects, the mixture comprises 1-100 kg, 1-75 kg, 1-50 kg, 1-20 kg, 1-10 kg, 1-5 kg, 1-2 kg, or less than 1 kg of graphene for every 10,000 kilograms of concrete. The inventor also contemplates that, in certain embodiments of the inventive subject matter, the mixture may comprise less aragonite than graphene.

In various other preferred embodiment of the inventive subject matter, the inventions disclosed herein may result in less quarry calcium carbonate being used in concrete when compared to traditional concrete production. It is further contemplated that the contemplated invention will result in less carbon dioxide emission than traditional concrete production.

In especially preferred embodiments, the aragonite used in the mixture comprises modified aragonite particles formed from restructured oolitic aragonite that have an average diameter less than or equal to 10 μm. Further, it may be appreciated that, in such preferred embodiments, the modified aragonite particles have an average particle diameter of between 100 nm and 10 μm.

Additionally, the inventor has discovered a method of reducing water penetration for concrete, the method comprising creating a mixture, wherein the mixture comprises aragonite and graphene, heating the mixture to a temperature between 500° C. and 2,500° C., drying the mixture, optionally removing oxygen from the mixture, and adding the mixture to concrete.

Most typically, this method further comprises removing oxygen from the mixture before adding the mixture to concrete. In other aspects, the mixture may be made into a paint, a resin, or a filler before being added to concrete. In preferred aspects, the mixture may comprise less than 1 kg, less than 2 kg, less than 5 kg, less than 10 kg, less than 20 kg, less than 50 kg, less than 75 kg, or less than 100 kg of graphene for every 10,000 kilograms of concrete.

In other preferred aspects, the mixture comprises 1-100 kg, 1-75 kg, 1-50 kg, 1-20 kg, 1-10 kg, 1-5 kg, 1-2 kg, or less than 1 kg of graphene for every 10,000 kilograms of concrete. The inventors also contemplate that, in certain embodiments of the inventive subject matter, the mixture may comprise less aragonite than graphene.

In various other preferred embodiment of the inventive subject matter, the inventions disclosed herein may result in less quarry calcium carbonate being used in concrete when compared to traditional concrete production. It is further contemplated that the contemplated invention will result in less carbon dioxide emission than traditional concrete production.

For especially preferred embodiments, the aragonite used in the mixture comprises modified aragonite particles formed from restructured oolitic aragonite that have an average diameter less than or equal to 10 μm. Further, it may be appreciated that, in such preferred embodiments, the modified aragonite particles have an average particle diameter of between 100 nm and 10 μm.

In a different embodiment of the inventive subject matter, the inventor has discovered a composition of superhydrophopic concrete, comprising a mixture comprising graphene and aragonite, wherein the mixture is heated and dried, and mixed with concrete. In preferred embodiments of this composition, oxygen may be removed from the mixture after the mixture is heated and dried. In other aspects of the inventive subject matter, the mixture used in the composition may be made into a paint, resin, or filler.

In preferred aspects, the mixture used in the composition may comprise less than 1 kg, less than 2 kg, less than 5 kg, less than 10 kg, less than 20 kg, less than 50 kg, less than 75 kg, or less than 100 kg of graphene for every 10,000 kilograms of concrete.

In other preferred aspects, the mixture comprises 1-100 kg, 1-75 kg, 1-50 kg, 1-20 kg, 1-10 kg, 1-5 kg, 1-2 kg, or less than 1 kg of graphene for every 10,000 kilograms of concrete. The inventors also contemplate that, in certain embodiments of the inventive subject matter, the mixture may comprise less aragonite than graphene.

Further, in various other preferred embodiments of the inventive subject matter, the inventions disclosed herein may result in less quarry calcium carbonate being used in concrete when compared to traditional concrete production. It is further contemplated that the contemplated invention will result in less carbon dioxide emission than traditional concrete production.

In especially preferred embodiments, the aragonite used in the mixture comprises modified aragonite particles formed from restructured oolitic aragonite that have an average diameter less than or equal to 10 μm. Further, it may be appreciated that, in such preferred embodiments, the modified aragonite particles have an average particle diameter of between 100 nm and 10 μm.

Seen from another perspective, the inventors additionally contemplate a method of reducing rusting in steel or concrete, the method comprising creating a mixture, wherein the mixture comprises aragonite and/or graphene, heating the mixture to a temperature between 500° C. and 2,500° C., drying the mixture, making the mixture into a paste; and applying the paste to steel or concrete. In preferred embodiments of this inventive subject matter, this method further includes the step of removing oxygen from the mixture before making the mixture into the paste. Viewed from yet another perspective, the paste may be a paint, resin, filler, or other material suitable to apply to steel or concrete.

In preferred aspects, the mixture may comprise less than 1 kg, less than 2 kg, less than 5 kg, less than 10 kg, less than 20 kg, less than 50 kg, less than 75 kg, or less than 100 kg of graphene for every 10,000 kilograms of concrete.

In other preferred aspects, the mixture comprises 1-100 kg, 1-75 kg, 1-50 kg, 1-20 kg, 1-10 kg, 1-5 kg, 1-2 kg, or less than 1 kg of graphene for every 10,000 kilograms of concrete. The inventors also contemplate that, in certain embodiments of the inventive subject matter, the mixture may comprise less aragonite than graphene.

In various other preferred embodiment of the inventive subject matter, the inventions disclosed herein may result in less quarry calcium carbonate being used in concrete when compared to traditional concrete production. It is further contemplated that the contemplated invention will result in less carbon dioxide emission than traditional concrete production.

In especially preferred embodiments, the aragonite used in the mixture comprises modified aragonite particles formed from restructured oolitic aragonite that have an average diameter less than or equal to 10 μm. Further, it may be appreciated that, in such preferred embodiments, the modified aragonite particles have an average particle diameter of between 100 nm and 10 μm.

DETAILED DESCRIPTION

The inventor has discovered that adding modified and/or unmodified graphene and/or aragonite to concrete results in concrete with higher resistance to water penetration. The inventor has further discovered that the process of making concrete, when done with graphene and aragonite, emits significantly less carbon dioxide, and requires less mining of quarry calcium carbonate, than traditional concrete production.

Graphene is a so-called 2D material comprising a single-layer of carbon atoms, featuring notable physical properties, including extreme strength when used in composite materials. The inventors contemplate that when concrete is mixed with graphene, the resulting mixture can be added to any form of concrete during batching. When added, the inventors contemplate that the mixture of graphene with concrete influences the hydration process and enhances the microstructural development whilst curing. In doing so, the use of this concrete can drive down emissions in the construction process by enabling up to a 30% reduction in the volume of concrete required, allowing for the reduction or even removal of steel reinforcement from concrete and steel materials to site.

The inventor contemplates that as little as 1 kg of concrete made with graphene may be added to 10 tons (10,000 kg) of concrete, enabling up to a 30% reduction in the volume of concrete required in construction. The inventors further contemplate than that similar benefits may be achieved by adding the concrete made with graphene in an amount between 1 kg and 5 kg, or alternatively in an amount between 5 kg and 10 kg, or in an amount between 10 kg and 20 kg, or in an amount between 20 kg and 50 kg to 10 tons of concrete. In some embodiments, the inventors also contemplate that adding concrete made with graphene in an amount less than 1 kg to 10 tons of concrete may enable up to a 30% reduction in the volume of concrete required in construction. Further, the inventor contemplates that the use of graphene in making concrete may reduce overall construction costs for projects by 10-20% through material and preliminary savings.

The inventor further contemplates that graphene-enhanced concrete differs structurally from traditional concrete in several ways. For instance, the inventors contemplate that the incorporation of graphene into concrete enhances the bridging between aggregates and the matrix, refines the pore structure and percolation of the microstructure, provides nucleation sites for new hydrated product formation, has a filler effect in the system, and potentially causes other structural differences on both the microscopic and macroscopic levels. The physical properties of graphene are contemplated to provide an optimized liquid admixture which is added to concrete at source and dispersed evenly, creating a highly enhanced concrete. It is contemplated by the inventor that the strength, durability, and tensile capacity of the concrete is increased by the addition of graphene, while the porosity, crack propagation, permeability, and carbon dioxide emission associated with the concrete is decreased.

It should be appreciated that where graphene is incorporated into concrete, graphene may either be modified or unmodified. Where the graphene is unmodified, it is generally preferred, but not necessarily required, that the graphene is a few-layer graphene having between 1 and 10, or between 5 and 20, or between 25 and 50 graphene planes. Such materials can be produced from a variety of sources using processes well known in the art (e.g., starting from graphite flakes that are then subjected to a pyrolytic shock with or without intercalated oxidizers). In addition, it should be noted that graphene and/or the source material graphite, can be chemically oxidized to form graphite oxide and graphene oxide, which has also been demonstrated to have high hydrophilicity (see e.g., *Adv. Mater.* 22, 2151-2154 (2010)). On the other hand, where the graphene is modified, the modified graphene may be produced in a process that intercalates one or more types of metal oxide nanoparticles, and especially $Fe_3O_4$ nanoparticles (see e.g., *RSC Adv.,* 2019, 9, 16235), or hydrophobic moieties can be covalently attached to the oxide groups of graphene oxide and especially few-layer graphene oxide. For example, graphene oxide can be further modified using octadecylamine to form a superhydrophobic graphene surface (see e.g., *Langmuir* 26, 16110-16114 (2010)). In still other known methods of making superhydrophobic graphene, vinylidene fluoride-hexafluoropropylene (PVDF-HFP) can be combined with graphene (see e.g., *Langmuir* 27, 8943-8949 (2011)). Similarly, superhydrophobic composites can also be made from a combination of micronized graphene and PVDF. In still further known composite materials, graphene and 2-methoxy-5-(20-ethyl-hexyloxy)-1,4-phenylene vinylene (MEH-PPV) particles can be combined to so form superhydrophobic composites (see e.g., *Carbon* 50, 216-224 (2012)).

In further embodiments, graphene may be applied to a surface, such as a rough surface of a metallic foam, and a hot vacuum oven may be used to facilitate the removal of oxygen, driving the foam with the graphene material into a superhydrophobic surface. In some embodiments, the superhydrophobic graphene materials are combined with a paint or other carrier system such as various resins or polymers to facilitate application to a surface. On the other hand, it should also be appreciated that the superhydrophobic materials may be directly formed on a surface, such as concrete or asphalt, which may be formed via microwave plasma chemical vapor deposition or any other method. Such process using microwave plasma chemical vapor is particularly advantageous as it produces few-layer graphene on a variety of materials (see e.g., *Carbon* 45, 2229-2234 (2007)). Moreover, the graphene planes in such few-layer graphene will often be vertically oriented, resulting in very high contact angles. In addition to self-cleaning and antimicrobial properties of such conduits, it should also be appreciated that the so treated conduits will have a significantly reduced tendency to corrode (and especially reduced tendency to electrochemical oxidation due to high salinity). Consequently, it should be appreciated that the materials presented herein will be especially advantageous for exposure to industrial run-off water or even salt water.

Another element of the contemplated invention is aragonite. Aragonite is formed naturally in all mollusk shells and in the calcareous endoskeletons of warm- and cold-water corals. Aragonite also accumulates as inorganic precipitates from marine cements in the ocean. While aragonite shares the same chemistry with calcite, aragonite is a polymorph of calcite having different symmetry and crystal structure from calcite. For example, in aragonite, the carbonate ions lie in two planes that point in opposite directions. This bi-planar configuration destroys the trigonal symmetry that is characteristic of calcite's structure. Aragonite's bi-planar structure gives rise, in turn, to aragonite's orthorhombic symmetry and relative instability at high temperature. Amorphous calcium carbonate can form into aragonite in specific conditions (e.g., coral-growing conditions, etc.). Such formed aragonite provides benefits being more resistant in shear stress and lower pH conditions, and will in turn, impart oxidation/corrosion resistance and increase mechanical strength.

The aragonite used herein for concrete may comprise a plurality of restructured calcium carbonate particles having an average diameter less than or equal to 10 μm. For example, the average particle diameter of the aragonite may be between 100 nm and 10 μm. additionally, or alternatively, at least half of the plurality of restructured calcium carbonate particles have a diameter between 100 nm and 10 μm. The aragonite is contemplated to be between 0.0005% to 5% of the total weight of the composition in typical embodiments. In some cases, the aragonite is derived from a portion of a marine animal. Additionally, the graphene used in the compositions and methods disclosed herein may be between 0.0005% to 1% of the total weight of the composition in typical embodiments. In some cases, the graphene is recycled graphene. Typically, the graphene comprises graphene nanoplatelets. For additional information and further uses of aragonite, see International application No. PCT/US2020/013562 which is incorporated by reference herein. Further, see the US published application with Pub. No. US 2022/0047474A1, which is incorporated by reference herein. Also see U.S. application Ser. No. 17/423,279, which was filed as application No. PCT/US2020/013562, and U.S. provisional application 63/233,660, filed on Aug. 16, 2021, provisional application No. 62/874,253, filed on Jul. 15, 2019, provisional application No. 62/867,489, filed on Jun. 27, 2019, and provisional application No. 62/792,735, filed on Jan. 15, 2019, all of which are incorporated by reference herein.

In some embodiments, the compositions disclosed herein may further comprise a surfactant. The surfactant may be between 0.0005% to 2% of the total weight of the composition.

Advantageously, the compositions and/or methods as disclosed herein may provide enhanced fire resistance to applicable surfaces. For example, in some embodiments, the compositions disclosed herein may be applied to concrete surfaces and thereby cause the concrete surfaces to have an ignition temperature of at least 1000° C.

As a further advantage, the concrete compositions as disclosed herein have increased strength compared to conventional pavement compositions without aragonite and/or graphene. Preferably, the pavement composition has increased strength and is less prone to buckling and/or rutting than conventional pavement compositions. Strength of the pavement composition may be measured using indirect tensile strength as disclosed herein. Further disclosed herein is a method of making a paved road with improved mechanical properties, comprising, mixing the composition as disclosed herein with stirring and compression at a temperature between 130° C. and 200° C., and laying the composition on the ground with mechanical pressure, to form the paved road. The method may further comprise blowing air through the hot composition to remove more volatile compounds, leading to a longer lifetime and added mechanical properties of the paved road.

The inventors contemplate that the superhydrophobicity of the methods and compositions disclosed herein further provides structural benefits and improved water resistance. Superhydrophobicity is the tendency of a surface to repel water drops. A surface is qualified as a superhydrophobic surface only if the surface possesses a high apparent contact angle (>150°), low contact angle hysteresis (<10°), low sliding angle (<5°) and high stability of Cassie model state. The use of superhydrophobic surfaces may provide a variety of benefits, such as making water-resistant surfaces, anti-fogging surfaces, anti-icing surfaces, anticorrosion surfaces, etc. In some cases, superhydrophobic surfaces may allow self-cleaning for various surfaces.

In the invention disclosed herein, it may be appreciated that making concrete with superhydrophobic surfaces will allow for great structural benefits, improved tensile capacity, reduced water penetration, reduced carbon dioxide emission, less mining of quarry calcium carbonate, and other benefits. It is contemplated that the same may be achieved by using superhydrophobic graphene, especially when coating or covering a surface with superhydrophobic graphene.

In the composition disclosed herein, concrete mix may be used to describe traditional concrete mix, or a mixture of cement and/or water and/or aggregates. Aggregates may include, but are not limited to, sand, gravel, stone, and/or quarry calcium carbonate. Concrete mix may alternatively be defined as any mixture including one or more of the ingredients typically found in traditional concrete, among other definitions.

In other embodiments, a mixture comprising aragonite and/or modified and/or unmodified graphene may be heated and dried into a paste. The paste may be applied to concrete which is already installed and dried. This may prove to be beneficial to fill cracks or erosion in any concrete, or simply applied to concrete for protective and preventative purposes. In such embodiments, the paste may be regular molding paste, coarse molding paste, hard molding paste, light molding paste, extra heavy molding paste, paint, resin, filler, or other kinds of paste. The inventors contemplate that such paste may be adapted to appear in various colors, textures, viscosities and thicknesses. This may be especially beneficial when applying the paste to concrete which has already been painted or coated with another paste.

Further, it should be readily appreciated that superhydrophobic graphene or mixtures comprising the same can be used to coat surfaces or devices that interface with water to further bolster their resistances to cracks and erosion. For examples, the surfaces of boats, ships, submarines, torpedoes, hydroelectric turbines, fishing lures, nets, props, etc., may benefit from a coating of superhydrophobic graphene, especially when the graphene is present in a mixture with aragonite and/or other ingredients for concrete or asphalt. Further, superhydrophobic graphene may be used to make paint or some other coating, which may be used to paint steel or concrete to prevent rusting. Still further, the inventors contemplate that superhydrophobic graphene may be used to create concrete without steel. It is contemplated that steel, especially when used to reinforce concrete, typically has high compressive strength but low tensile strength. Therefore, the inventors contemplate that adding superhydrophobic graphene instead of steel may provide concrete with both high compressive strength and high tensile strength. It is further contemplated that the addition of aragonite along with superhydrophobic graphene further bolsters the strength of concrete and thus further eliminates the need for steel.

In still further embodiments, the inventors contemplate that superhydrophobic graphene may be implemented in various desalination concepts. It is contemplated that the use of superhydrophobic graphene in desalination aids in preventing salt from exiting a solution. For example, it is contemplated that within a desalination plant made or coated with superhydrophobic graphene, saline may be heated, typically at a temperature of more than 600° C., to evaporate water from the saline. Typically, the steam thereby formed may be removed to a condensation zone which may optionally be recirculated into the saline after condensation. It is further contemplated that the remaining saline will be a hypertonic saline solution which may optionally be recirculated. The inventors contemplate that the heating may serve dual benefits, among other benefits. First, the heat allows separation of the water from the salt, typically allowing a collection of solid salt precipitate or a hypertonic saline solution. Second, the heat may improve the superhydrophobic nature of the modified graphene.

Further, it is contemplated that heat may be provided through various means, especially as it relates to desalination. For example, solar heat or energy may be suitable means to heat salt water or saline. In some embodiments, solar heat or energy is captured with a heliostat which may optimally reflect light from the sun based on the sun's position at a given moment throughout the day. The reflected light may be captured to provide thermal energy which may be used to heat a desalination reactor filled with saltwater or saline. In further embodiments, waste heat provided by various exothermic reactions may be captured and utilized to heat salt water or saline. For instance, desalination methods may utilize a sulfuric acid plant which produces sulfuric dioxide, a highly exothermic reaction, to capture the heat in a heat boiler, heat exchanger, and/or other devices for capturing heat.

The inventors have also discovered that the compositions of concrete disclosed herein may be self-healing. Therefore, in some embodiments of the disclosed subject matter, calcium oxide may be used as opposed to or in addition to cement. It is contemplated that the exothermic reaction between calcium oxide and water may create stronger and longer lasting bonding. Such reaction may seal the concrete finish better and if it cracks would expose unhydrated calcium oxide allowing the bonding to continue to seal cracks well into the future. It is preferred, but not necessary, that the calcium oxide used is produced by heating limestone in a kiln to a temperature of at least 900° C., especially preferably at 1100° C. Further, lime clasts can dissolve into cracks and recrystallize after exposure to water, healing cracks created by weathering before they spread. Such use of calcium oxide may further reduce concrete's carbon footprint. It is further contemplated that calcium oxide may be obtained from aragonite. For more information on self-healing via bonding of unhydrated calcium oxide, see Linda M. Seymour et al., Hot mixing: Mechanistic insights into the durability of ancient Roman concrete. *Sci. Adv.* 9, eadd1602 (2023), which is incorporated by reference herein. Further, see Ranade R et al., Cement and Concrete Research 58, 1-12 (2014), which is also incorporated by reference herein.

Further, self-healing surfaces may be enabled by the introduction of synthetic materials with tunable wetting properties. For example, among many other available synthetic materials, nanostructured materials have attracted most of the attention due to their inherent multi-scaled surface roughness and their surfaces can be readily functionalized by common methods. Several examples of these nanostructured materials include ZnO, $SiO_2$, ITO, and carbon nanotubes (CNT), and particularly superhydrophobic graphene. It is contemplated that the ability to tune the wetting properties of CNT and superhydrophobic graphene has promising implications for providing self-healing capabilities, among other benefits, in concrete. In particular, the inventor contemplates that plasma and/or ultraviolet (UV) treatment of CNT or superhydrophobic graphene surfaces provide improvements in tensile properties. The inventor contemplates that, where superhydrophobic graphene is used, especially given the aggregate nature of the superhydrophobic graphene material in powder form, the exposure of just a small portion of the material's surface area may be treated with ultraviolet light or plasma to increase the efficiency. Plasma in this treatment is characterized by atmospheric pressure (therefore hot plasma, temperatures up to 10,000° C.). The working gas may be Argon, induced by microwave at 915 MHz o 2450 MHz, at powers between 1 kW and 10 kW.

For more information on techniques to modify the surface properties of carbon-based nanomaterials and their effects on wettability and functionality, see Aria, A. I., and Gharib, M., "Reversible Tuning of the Wettability of Carbon Nanotube Arrays: The Effect of Ultraviolet/Ozone and Vacuum Pyrolysis Treatments," Langmuir, Vol. 27, No. 14, pp. 9005-9011, 2011, and further see Aria, A. I., Gharib, M., Dry Oxidation and Vacuum Annealing Treatments for Tuning the Wetting Properties of Carbon Nanotube Arrays. J. Vis. Exp. (74), e50378, 2013, both of which are incorporated by reference herein. Further, for more information about treatment of CNT surfaces to improve efficiency, see Kim, J.-K., et al., "Functionalization of Carbon Nanotube Surface Via UV/O3 Treatment," Solid State Phenomena, Vols. 121-123, pp. 1407-1410, 2007., and see Kim, J.-K., et al., "Surface Functionalities of Multi-Wall Carbon Nanotubes After UV/Ozone and TETA Treatments," Carbon, Vol. 44, No. 4, pp. 768-777, April 2006. DOI:10.1016/j.carbon.2005.09.013., and further see Siddiqui, N. A., et al., "Carbon Nanotubes with Dual Wall Structure; Properties and Fracture Behavior of Epoxy Nanocomposites," Department of Mechanical Engineering, Hong Kong University of Science and Technology, Hong Kong., all of which are incorporated by reference herein.

Further, it is contemplated that the compositions and/or methods disclosed herein may involve self-sensing concrete. It is contemplated that Engineered Cementitious Composites (ECCs) may be used as structural materials which may provide self-sensing capabilities in concrete. ECCs are ultra-ductile fiber reinforced cement-based composites which, unlike typical fiber reinforced concretes (FRCs), have a strain hardening behavior under tension as a direct result of their micromechanics-based design. The tensile strain capacity (tensile ductility) of an ECC is at least 100 times higher than a structural concrete. In further embodiments, it is contemplated that micro-cracking, especially inelastic multiple micro-cracking, may be applied to ECCs or other materials used to produce concrete herein to thereby produce self-sensing resilient structural materials. The inventor contemplates that the use of ECCs may enhance the self-sensing abilities, self-healing abilities, and other qualities of concrete or asphalt through various means. In still further embodiments, the inventor contemplates compositions and methods of glass fiber concrete. In one embodiment, the inventor contemplate a mixture comprising graphene, aragonite, and glass fibers may be integrated into concrete production to produce glass fiber concrete with enhanced strength. Such glass fibers may be bonded together as steel replacement in certain embodiments.

For further information on the use of ECCs, see Ranade, R., et al., "Influence of Micro-cracking on the Composite Resistivity of Engineered Cementitious Composites," Cement and Concrete Research, Vol. 58, pp. 1-12, 2014., and further see Sakulich, A. R., et al., "Nanoscale Characterization of Engineered Cementitious Composites (ECC)," Cement and Concrete Research, Vol. 41, pp. 169-175, 2011., both of which are incorporated by reference herein.

Additionally, see Kong, H. J., et al., "Constitutive Rheological Control to Develop a Self-Consolidating Engineered Cementitious Composite Reinforced with Hydrophilic Polyvinyl Alcohol Fibers," Cement and Concrete Composites, Vol. 25, No. 3, pp. 333-341, 2003., and further see Li, V. C., et al., "Flexural Behaviors of Glass Fiber-Reinforced Polymer (GFRP) Reinforced Engineered Cementitious Composite Beams," ACI Materials Journal, Vol. 99, No. 1, pp. 11-21, January-February 2002., and finally Ranade, R., et al., "Composite Properties of High-Strength, High-Ductility Concrete," ACI Materials Journal, Vol. 110, No. 4, pp. 413-422, 2013. for further information on the use of ECCs in concrete production. All of the previously cited articles are incorporated by reference herein.

In some embodiments, the numbers expressing quantities of ingredients, properties such as concentration, reaction conditions, and so forth, used to describe and claim certain embodiments of the invention are to be understood as being modified in some instances by the term "about." As used herein, the terms "about" and "approximately", when referring to a specified, measurable value (such as a parameter, an amount, a temporal duration, and the like), is meant to encompass the specified value and variations of and from the specified value, such as variations of +/−10% or less, alternatively +/−5% or less, alternatively +/−1% or less, alternatively +/−0.1% or less of and from the specified value, insofar as such variations are appropriate to perform in the disclosed embodiments. Thus, the value to which the modifier "about" or "approximately" refers is itself also specifically disclosed. The recitation of ranges of values herein is merely intended to serve as a shorthand method of referring individually to each separate value falling within the range. Unless otherwise indicated herein, each individual value is incorporated into the specification as if it were individually recited herein.

All methods described herein can be performed in any suitable order unless otherwise indicated herein or otherwise clearly contradicted by context. The use of any and all examples, or exemplary language (e.g., "such as") provided with respect to certain embodiments herein is intended merely to better illuminate the invention and does not pose a limitation on the scope of the invention otherwise claimed. No language in the specification should be construed as indicating any non-claimed element essential to the practice of the invention.

As used in the description herein and throughout the claims that follow, the meaning of "a," "an," and "the" includes plural reference unless the context clearly dictates otherwise. Also, as used in the description herein, the meaning of "in" includes "in" and "on" unless the context clearly dictates otherwise. As also used herein, and unless the context dictates otherwise, the term "coupled to" is intended to include both direct coupling (in which two elements that are coupled to each other contact each other) and indirect coupling (in which at least one additional element is located between the two elements). Therefore, the terms "coupled to" and "coupled with" are used synonymously.

It should be apparent to those skilled in the art that many more modifications besides those already described are possible without departing from the inventive concepts herein. The inventive subject matter, therefore, is not to be restricted except in the scope of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced. Where the specification or claims refer to at least one of something selected from the group consisting of A, B, C . . . and N, the text should be interpreted as requiring only one element from the group, not A plus N, or B plus N, etc.

What is claimed is:

1. A method of reducing rusting in steel or concrete, the method comprising:

combining and mixing aragonite and superhydrophobic graphene to form a mixture;

heating the mixture to a temperature between 500° C. and 2,500° C.;

drying the mixture;

making the mixture into a paste; and applying the paste to the steel or the concrete.

2. The method of claim 1, further comprising removing oxygen from the mixture before making the mixture into the paste.

3. The method of claim 1, wherein the paste is formulated as a paint, resin, or filler.

4. The method of claim 1, wherein aragonite is present in the mixture a quantity less than the superhydrophobic graphene.

5. The method of claim 1, wherein the method results in less quarry calcium carbonate in concrete than traditional concrete production.

6. The method of claim 1, wherein the method results in less carbon dioxide emission than traditional concrete production.

7. The method of claim 1, wherein the aragonite comprises modified aragonite particles formed from restructured oolitic aragonite that have an average diameter less than or equal to 10 μm.

8. The method of claim 7, wherein the modified aragonite particles have an average particle diameter of between 100 nm and 10 μm.

9. The method of claim 1, wherein the superhydrophobic graphene comprises few-layer graphene.

10. The method of claim 1, wherein the superhydrophobic graphene comprises hydrophobic moieties covalently attached to the graphene.

11. The method of claim 1, wherein the superhydrophobic graphene is in admixture with additional hydrophobic materials.

12. The method of claim 1, wherein the paste is applied to steel, and wherein the steel is used to reinforce concrete.

13. The method of claim 1, wherein the paste is applied to concrete.

* * * * *